United States Patent [19]

Wong et al.

[11] Patent Number: 5,215,498
[45] Date of Patent: Jun. 1, 1993

[54] VENTILATION CONTROLLER

[75] Inventors: Jacob Y. Wong, Santa Barbara; John R. McGibbon, Goleta, both of Calif.

[73] Assignee: Gaztech International Corporation, Goleta, Calif.

[21] Appl. No.: 711,630

[22] Filed: Jun. 6, 1991

Related U.S. Application Data

[63] Continuation-in-part of Ser. No. 663,546, Mar. 4, 1991, abandoned.

[51] Int. Cl.$^5$ .............................................. F24F 11/00
[52] U.S. Cl. .................................. 454/208; 236/44 C; 454/256
[58] Field of Search ............... 454/200, 207, 208, 256, 454/259, 278, 338, 257, 342; 236/44 C, 49.3; 49/31; 165/16

[56] References Cited

U.S. PATENT DOCUMENTS

| | | | |
|---|---|---|---|
| 2,131,295 | 9/1938 | Persons | 236/44 C |
| 3,249,038 | 5/1966 | Johnson | 454/338 X |
| 4,257,319 | 3/1981 | Kucharczyk | 454/256 |
| 4,437,608 | 3/1984 | Smith | 236/49.3 X |
| 4,742,761 | 5/1988 | Horstman | 454/238 X |
| 4,755,473 | 7/1988 | Nishino et al. | 73/31.05 X |
| 4,776,385 | 10/1988 | Dean | 236/49.3 X |
| 4,819,551 | 4/1989 | Vole | 49/31 X |
| 4,911,065 | 3/1990 | Van Becelaere | 454/256 X |
| 4,928,583 | 5/1990 | Taylor et al. | 454/342 X |
| 4,960,041 | 10/1990 | Kiser | 236/49.3 X |

FOREIGN PATENT DOCUMENTS

| | | | |
|---|---|---|---|
| 3223424 | 12/1983 | Fed. Rep. of Germany | 236/49.3 |
| 24931 | 2/1986 | Japan | 454/338 |

*Primary Examiner*—Harold Joyce
*Attorney, Agent, or Firm*—Daniel C. McKown

[57] ABSTRACT

An affordable ventilation controller comprises a low cost and very stable carbon dioxide sensor and a remote-controlled louvered suction fan equipped with an air filter. The ventilation controller operates independently of any existing heating or cooling system that might be present in a closed room. The carbon dioxide sensor measures accurately the gas concentration level in parts-per-million (ppm's) as a ventilation index. When a predetermined ventilation index is exceeded indicative of bad ventilation, a remote-controlled suction fan equipped with a louver and an air filter is activated to draw in fresh air from the outside in order to regulate the $CO_2$ concentration and provide good ventilation. However, if an exceedingly high concentration of $CO_2$ is sensed, the controller inhibits the control signal to the suction fan, since such a high level might indicate the presence of a fire.

9 Claims, 2 Drawing Sheets

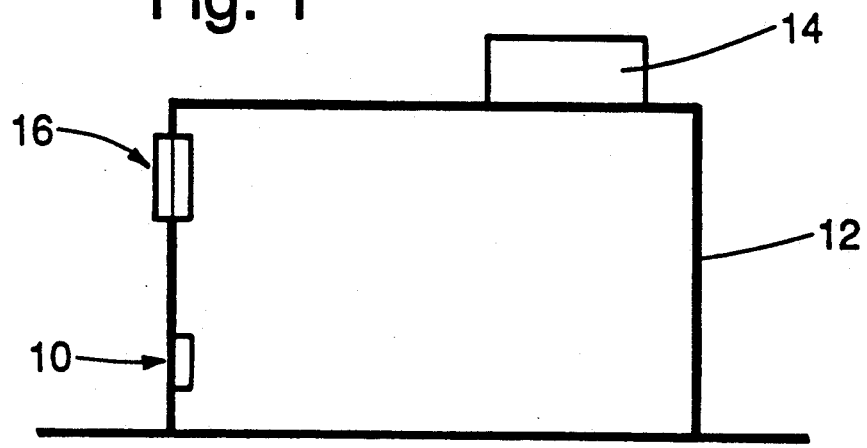
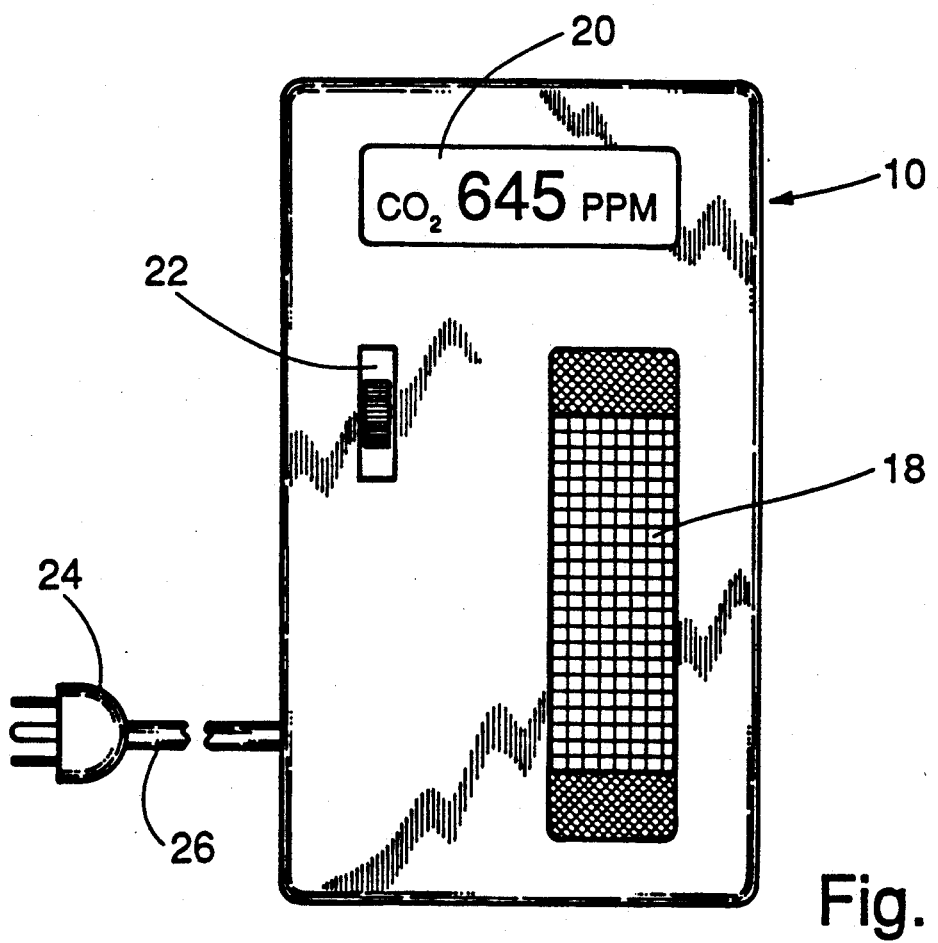

VENTILATION CONTROLLER

RELATED PATENT APPLICATION

This application is a continuation-in-part of U.S. patent application Ser. No. 07/663,546 filed Mar. 4, 1991 abandoned for VENTILATION CONTROLLER by the present inventor. Priority of that application is claimed for matter common to it and the present application.

BACKGROUND OF THE INVENTION

1. Field of the Invention

The present invention is in the field of ventilation and more specifically relates to a system through which the supply of outside air to a closed dwelling space or class room is controlled to maintain the freshness and hygiene of the air inside independent of any permanent air conditioning system that might or might not be present.

2. The Prior Art

Throughout man's history there has never existed a quantitative yardstick available to him for assessing the quality of indoor air. The common variables used to characterize indoor air are the temperature and the relative humidity (RH). While these variables are certainly important in deciding the perceived comfort of one's surroundings, they nonetheless bear little relevance in determining the actual quality of indoor air.

Good air quality is often described as being "fresh," "nice" or "invigorating." Similarly, terms such as "foul," "stale" or "stuffy" are frequently used to designate bad quality or unbearable air but without any quantitative definition of what is meant.

For as long as one can remember, air conditioning systems have been devised to provide "good" air inside buildings based upon the parameters of air temperature and RH.

The inability of air temperature and relative humidity to characterize air quality can best be exemplified by remembering those instances when one has walked into an air-conditioned room and experienced the unmistakable bad odor of stuffy air. The occurrence of this episode, especially in midsummer, is invariably caused by the air-conditioning system recirculating only indoor air in order to save energy. A similar situation prevails in the winter when a heating system recirculates only indoor air in order to avoid the needed heating of the much colder, but fresher, outside air.

Good quality air necessarily means that the air has adequate oxygen content, low carbon dioxide ($CO_2$) concentration, and few dust particle and microorganism counts.

Among the first attempts to control the air quality of a closed space using additional parameters other than temperature and relative humidity was the work of Anderten, et al. in U.S. Pat. No. 4,164,172. They describe method and apparatus for controlling the amount of outside air introduced into a given space being ventilated as a function of the oxygen content of the air in the space in such a way as to minimize the energy expended in heating or cooling the air.

In U.S. Pat. No. 4,567,939 Dumbeck further disclosed the use of a general purpose programmed computer to control an air circulation type air-conditioning system as the operating equipment between temperature, RH and oxygen sensors, and control devices for modifying temperature, RH and oxygen content of the circulating air.

As alluded to briefly above, an adequate supply of oxygen is not the only criterion determining the quality of indoor air. The $CO_2$ concentration level and the dust particle and microorganism counts are equally important in characterizing good air quality. While dust particles and microorganisms can usually be controlled by the use of appropriate filters and/or electrostatic precipitators, the control of carbon dioxide has remained elusive. It is by far the most significant indoor air pollutant.

Human beings and animals alike produce a large amount of $CO_2$ by virtue of their body metabolism, namely the derivation of energy by the burning of carbohydrates in the presence of oxygen. The end products are water and carbon dioxide. Surprisingly, the level of $CO_2$ at the end of each of our breaths reaches as high as 50,000 parts per million (ppm) for normal individuals (100% $CO_2$ = 1 million ppm of $CO_2$).

While $CO_2$ concentration can be as low as 300-400 ppm for pristine outdoor air, the indoor $CO_2$ level averages between 600 to 1,500 ppm depending on how many people are present in a particular space and how airtight it is.

Although a high level of $CO_2$ indoors by itself is not necessarily a health hazard provided that the level does not rise above 3,000–5,000 ppm for prolonged periods, a high level of $CO_2$ (above 1,000 ppm) does indicate poor ventilation which leads to other problems as will be explained below.

The $CO_2$ level is an extremely good parameter for indexing the degree of ventilation indoors. When ventilation is poor, the level of $CO_2$ tends to remain high or even rises slowly. Conversely, since the $CO_2$ level is invariably lower outdoors (typically 400-500 ppm) good indoor ventilation leads to much lower $CO_2$ levels. This explains why $CO_2$ level is such a good parameter for indexing indoor ventilation.

Coblentz was the first to recognize in U.S. Pat. No. 2,984,082 that comfort is affected by the freshness of the air as well as its temperature and humidity. He disclosed a method of using a $CO_2$ meter to control the admission of outside air in an integrated air-conditioning system. The $CO_2$ meter, as part of the overall air-conditioning system and positioned in the return air duct, actually measures the quantity of $CO_2$ in the return air which is then used to open or close a motor-driven damper for controlling the intake of outside air. Nishimuro in Japanese Patent No. 0136928 disclosed a very similar air-conditioning system.

In U.S. Pat. No. 3,593,711, Staub and McGoff disclosed a dual canister chemical type life support system which can be used to remove excess $CO_2$ from air continuously and periodically add oxygen to it as needed.

In another U.S. Pat. No. 4,631,872, Daroga disclosed the design of a nuclear blast and fall-out shelter which can accommodate a number of people completely enclosed for several weeks. The shelter is provided with an oxygen supply, an air conditioner, and a hand-operated pump for introducing external air to maintain adequate oxygen to sustain life.

Finally, Tokunaga in Japanese Patents Nos. 281549 and 281550 disclosed how an air-conditioning system can be augmented by a personnel sensor and a $CO_2$ sensor in a room to effect the intake of outside air for maintaining the $CO_2$ concentration of the room at a desired level.

Despite the numerous disclosures of methods and apparatus cited above and despite the correct recognition that adequate ventilation is the only effective way of ensuring good indoor air quality, the use of indoor $CO_2$ level as an adjunct to temperature and humidity for optimizing the performance of heating/cooling systems is seldom practiced today. Instead, modern air-conditioning systems simply deliver adequate airflow to office buildings based upon body-counts, time of day and season. The concentration of carbon dioxide is generally not measured.

The reason why carbon dioxide level is generally not used to control the air-conditioning system can be traced back to the lack of a reliable, accurate and drift-free $CO_2$ sensor. If the $CO_2$ sensor drifts excessively or becomes erratic, the whole air-conditioning system will malfunction leading to an unacceptable situation.

Because of this lack of an accurate, reliable and drift-free $CO_2$ sensor, most of the ordinary residences and small offices in this country continue to suffer from poor ventilation due to uncontrolled and often elevated $CO_2$ levels indoors. The situation is particularly acute during the cold winter months when all doors and windows are shut tight in order to save heating fuel. A simple yet affordable ventilation controller which can work independently of the often cumbersome heating/cooling systems for homes or office buildings is clearly needed in order to alleviate indoor air pollution problems that result from poor ventilation.

SUMMARY OF THE INVENTION

The present invention is a ventilation controller that provides good quality indoor air having an acceptable $CO_2$ level. While following earlier suggestions of using indoor $CO_2$ concentration as a controlled variable, the present invention differs significantly from earlier approaches.

Unusual as it might seem on first impression, the carbon dioxide controller of the present invention is not integrated into a unified air conditioner that controls temperature, relative humidity and $CO_2$ simultaneously. That is, the carbon dioxide controller of the present invention is not mechanically or electrically connected to an existing air-conditioning system, but instead acts upon the indoor air in conjunction with the existing air-conditioning system to improve the quality of the indoor air.

The tendency of the prior art carbon dioxide sensors to drift, leading to inaccurate measurement of the $CO_2$ concentration, has been overcome in the present invention by using a newly-developed sensor that works on the absorption of infrared radiation by the carbon dioxide present. Sensors of this type are described in U.S. patent application Ser. No. 07/503,215 filed Apr. 2, 1990 by the present inventor for "Rapid Fire Detector" and in U.S. patent application Ser. No. 07/503,214 filed Apr. 2, 1990 by the present inventor for "Simple Fire Detector." These applications are incorporated by reference herein.

In accordance with the present invention, the user presets a desired concentration of $CO_2$ into the sensor unit. This preset value is compared with the continuously measured value, and when the measured concentration exceeds the desired concentration, a control signal is generated by a controller located in the same unit as the sensor.

The control signal is transmitted, by wire, by radio, or by infrared radiation to a second unit that is mounted in a window and that includes a suction fan, controlled by the control signal, for drawing outdoor air into the room. It is not necessary for the system of the present invention to heat or cool this drawn-in air or to alter its humidity, because the existing air-conditioning system routinely does these tasks. The outdoor air is drawn in through a filter that captures dust and pollen. A louver effectively closes the window when the fan is not operating.

In a preferred embodiment of the present invention, if the sensor unit measures an extremely high concentration of carbon dioxide, the controller generates a signal that turns off the fan and closes the louver. Such a high concentration is more consistent with the hypothesis that a fire is in progress than with the hypothesis that the room is extremely stuffy.

The novel features which are believed to be characteristic of the invention, both as to its structure and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a diagram showing a side elevational view of a room in which the ventilation system of the present invention is installed;

FIG. 2 is a front elevational view showing the carbon dioxide sensor and controller used in a preferred embodiment of the present invention;

DETAILED DESCRIPTION OF THE PREFERRED EMBODIMENT

Figure 3:
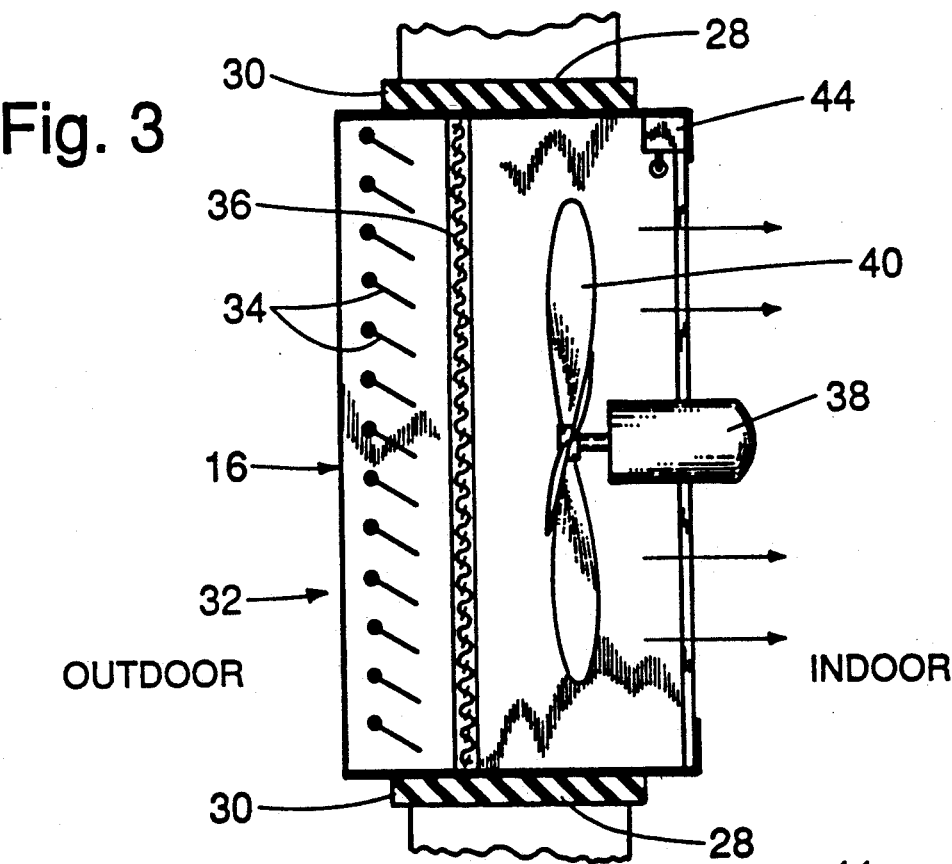
FIG. 3 is a side elevational view in cross section showing a louvered fan used in the present invention; and, FIG. 4 is a front elevational view of the louvered fan of FIG. 3.

FIG. 1 is a diagram showing a room 12 that is air conditioned by a conventional air-conditioning system 14 and in which the ventilation system of the present invention has been installed.

In the preferred embodiment, the conventional air conditioner 14 acts to control the temperature and the humidity of the air within the room 12. As described above, controlling those two variables does nothing to remedy an excessively high concentration of carbon dioxide in the room. Such an excessively high level results in drowsiness if not corrected. In an alternative embodiment, the conventional air conditioning system 14 controls only the temperature of the air within the room. The present invention is also compatible with this type of conventional air conditioner.

In accordance with the present invention, a carbon dioxide sensor and controller unit 10 is mounted on a wall of the room 12, typically.

The room must have a window or comparable opening to the outdoors so that the window-mounted louvered suction fan 16 can bring fresh outdoor air into the room 12. As described above, the outdoor air normally contains considerably less carbon dioxide than the air within the room. In the present invention, the window-mounted louvered suction fan 16 is controlled by the carbon dioxide sensor and controller unit 10.

FIG. 2 is a front elevational view of the carbon dioxide sensor and controller unit 10. The unit includes the carbon dioxide sensor 18, which senses the concentration of carbon dioxide in the room and produces an electrical signal representative of the concentration. A display 20, operating on this signal, continuously displays the concentration of carbon dioxide in parts per million. This permits a person in the room to judge whether the carbon dioxide level is too high, and to take corrective action by using the ventilation system of the present invention.

The carbon dioxide sensor and controller unit shown in FIG. 2 also includes a range selector switch 22 that a person in the room can use to set a desired concentration level into the controller.

The controller, contained within the unit 10 compares the signal produced by the carbon dioxide sensor 18 with a signal corresponding to the desired carbon dioxide concentration. If the carbon dioxide concentration as sensed is already less than the present value, the system takes no action. Likewise, if the carbon dioxide concentration exceeds a factory-preset very high level such as 5000 ppm, the controller generates no control signal and the fan 16 remains disabled; in this circumstance there may be a fire in the room 12 or the sensor may be malfunctioning. The user is not conscious of the existence of this factory-preset very high level. However, if the sensed concentration of carbon dioxide falls between the user-set valve and the factory-preset very high level, the controller generates a control signal that enables the fan 16 to operate. The system thus operates in a fail-safe manner; the fan is not enabled unless the control signal is generated and received. However, if the sensed level of carbon dioxide is greater than the desired concentration set in by the user, the controller generates a control signal.

The control signal thus generated is transmitted to the window-mounted louvered suction fan 16. In a preferred embodiment, the control signal is transmitted by a wire, but in other embodiments it may be transmitted in the form of a radio signal, either through the air or through the electrical power wires already present in the building. In yet another embodiment, the control signal is transmitted in the form of infrared radiation. The control signal is received by the receiver 42 of FIG. 4, and used to operate a relay 44 or electronic switch to control the application of electrical power to the fan motor 38.

Figure 4:
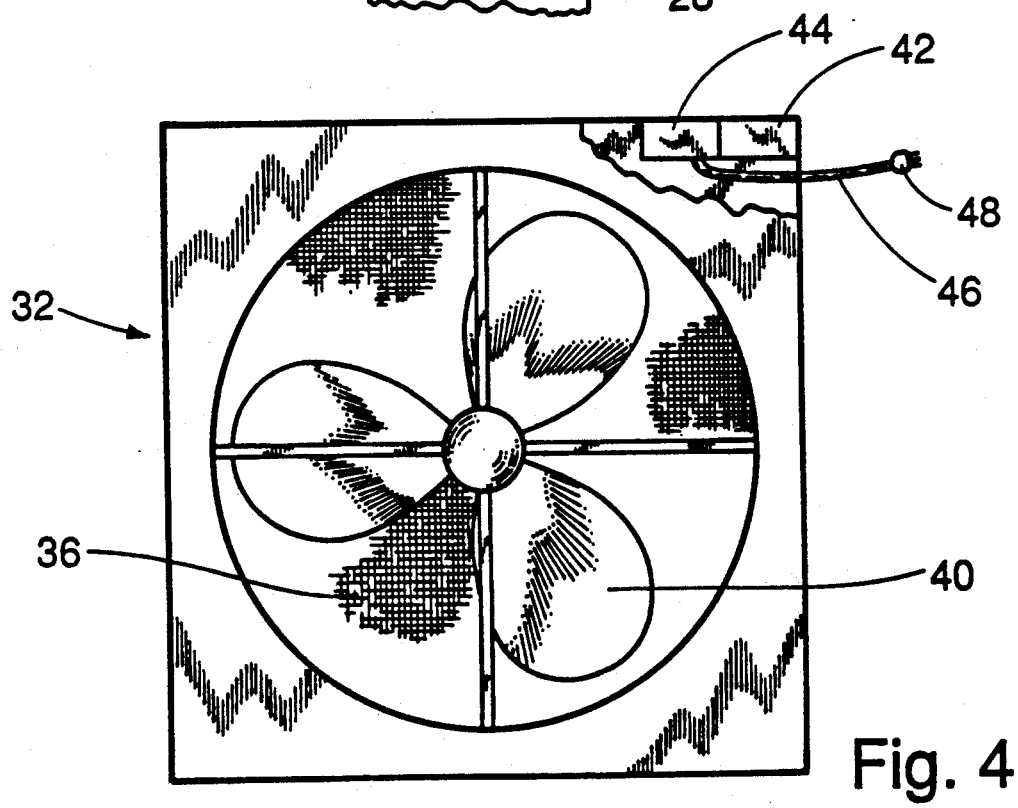

The window-mounted louvered suction fan 16 of FIG. 1 is shown in greater detail in FIGS. 3 and 4. The unit includes a housing 32 that fits within the opening defined by the window frame 28, and a close seal is assured by use of the adapter 30. Within the housing 32 is a louver consisting of a number of pivotable slats 34. When the fan is not running, the slats hang vertically under the action of gravity. In an alternative embodiment the slats 34 latch into their closed position, but are released from it when the fan is turned on by the relay 44 through the use of a magnetic actuator. A filter 36 is also located in the housing 32 and its purpose is to keep out, to some extent, pollen, dust, and other pollutants that might be present in the outdoor air. The motor 38 turns the propeller 40 to draw air into the room 12 from outdoors.

The filter 36 may take any of several forms. In one aspect, the filter may be coated with a silicone solution to discourage water droplets from entering the room. In another embodiment, the filter includes activated charcoal which actively absorbs certain odors and unwanted gases from the air. In yet another embodiment, a second filter is located on the downstream side of the propeller 48 to help absorb sounds generated by the propeller.

In operation, the desired range of carbon dioxide concentration is set into the controller by the user through the range selector switch 22. If the carbon dioxide concentration is greater than this desired value, but less than the factory-preset very high level, the control signal will be generated by the controller in the unit 10, and transmitted to the receiver 42 in the unit 16. The presence of the control signal trips the relay 44 in the unit 16 turning on the fan which then sucks air into the room from outdoors through the filter 36.

Typically, the air brought in from the outdoors is not at the same temperature as the air within the room 12. In accordance with the present invention, the conventional air conditioner 14 is relied upon to operate on the air brought in to condition its temperature and humidity to render them approximately equal to some preset desired values.

Thus, the present invention assists the conventional air conditioner 14 in its overall purpose of rendering the air in the room more healthy, specifically by maintaining its carbon dioxide level at a relatively low value. Likewise, the conventional air conditioner 14 assists the present invention by heating or cooling and by adding or removing moisture from the air that is brought in from outdoors by the present invention.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. A year-round ventilation system for maintaining preset levels of temperature, humidity, and carbon dioxide in the air within a room having a window, comprising:

an air conditioning system that heats the air in the room when the air temperature is less than a preset temperature, that cools the air when the air temperature is greater than a preset temperature, that adds moisture when the humidity is less than a preset humidity, and that removes moisture when the humidity is greater than a preset humidity;

a carbon dioxide controller including a carbon dioxide sensor that senses the concentration of carbon dioxide in the air in the room and produces an electrical signal representative of the carbon dioxide concentration;

a controller electrically connected to said carbon dioxide sensor and responsive to said electrical signal representative of the carbon dioxide concentration, to a carbon dioxide level preset by a user, and to a factory-preset carbon dioxide level to produce a control signal only when the sensed carbon dioxide level in the room is less than the factory-preset carbon dioxide level and greater than the carbon dioxide level preset by the user; and, means mounted in the window of the room and responsive to said control signal for bringing fresh air into the room through the window and for sealing the window in the absence of said control signal;

said carbon dioxide controller not connected to said air-conditioning system yet cooperating with said air-conditioning system by providing control of the carbon dioxide concentration in the air in the room, and said air-conditioning system cooperating with said carbon dioxide controller to condition the temperature and humidity of the fresh air brought into the room through the window by said carbon dioxide controller.

2. The year-round ventilation system of claim 1 wherein said carbon dioxide sensor further comprises a source of infrared radiation radiating at a wavelength that coincides with an absorption band of carbon dioxide.

3. The year-round ventilation system of claim 1 wherein said carbon dioxide sensor further comprises means for displaying the sensed concentration of carbon dioxide in the air.

4. A year-round ventilation system for maintaining preset levels of temperature and carbon dioxide in the air within a room having a window, comprising:

an air conditioning system that heats the air in the room when the air temperature is less than a preset temperature and that cools the air when the air temperature is greater than a preset temperature;

a carbon dioxide controller including
  a carbon dioxide sensor that senses the concentration of carbon dioxide in the air in the room and produces an electrical signal representative of the carbon dioxide concentration;
  a controller electrically connected to said carbon dioxide sensor and responsive to said electrical signal representative of the carbon dioxide concentration, to a carbon dioxide level preset by a user, and to a factory-preset carbon dioxide level to produce a control signal only when the sensed carbon dioxide level in the room is less than the factory-preset carbon dioxide level and greater than the carbon dioxide level preset by the user; and,
  means mounted in the window of the room and responsive to said control signal for bringing fresh air into the room through the window and for sealing the window in the absence of said control signal;

said carbon dioxide controller not connected to said air-conditioning system yet cooperating with said air-conditioning system by providing control of the carbon dioxide concentration in the air in the room, and said air-conditioning system cooperating with said carbon dioxide controller to condition the temperature of the fresh air brought into the room through the window by said carbon dioxide controller.

5. The year-round ventilation system of claim 4 wherein said carbon dioxide sensor further comprises a source of infrared radiation radiating at a wavelength that coincides with an absorption band of carbon dioxide.

6. The year-round ventilation system of claim 4 wherein said carbon dioxide sensor further comprises means for displaying the sensed concentration of carbon dioxide in the air.

7. A carbon dioxide controller for maintaining a preset concentration of carbon dioxide in a room having a window, comprising:

a carbon dioxide sensor that senses the concentration of carbon dioxide in the air in the room and produces an electrical signal representative of the carbon dioxide concentration;

a controller electrically connected to said carbon dioxide sensor and responsive to said electrical signal representative of the carbon dioxide concentration, to a carbon dioxide level preset by a user, and to a factory-preset carbon dioxide level to produce a control signal only when the sensed carbon dioxide level in the room is less than the factory-preset carbon dioxide level and greater than the carbon dioxide level preset by the user; and, means mounted in the window of the room and responsive to said control signal for bringing fresh air into the room through the window and for sealing the window in the absence of said control signal.

8. The carbon dioxide controller of claim 7 wherein said carbon dioxide sensor further comprises a source of infrared radiation radiating at a wavelength that coincides with an absorption band of carbon dioxide.

9. The carbon dioxide controller of claim 7 wherein said carbon dioxide sensor further comprises means for displaying the sensed concentration of carbon dioxide in the air.

* * * * *